(12) United States Patent
Mahasenan et al.

(10) Patent No.: US 12,707,370 B1
(45) Date of Patent: Aug. 11, 2026

(54) SYSTEMS AND METHODS FOR GENERATING DEVICE MAPS OF WIRELESS MESH NETWORKS

(71) Applicant: Apple Inc., Cupertino, CA (US)

(72) Inventors: Arun Vijayakumari Mahasenan, Fremont, CA (US); Eran Avidor, Tel-Aviv (IL); Rafi Vitory, Herzliya (IL); Ron Eyal, Herzliya (IL); Venkateswara Rao Manepalli, San Jose, CA (US)

(73) Assignee: Apple Inc., Cupertino, CA (US)

( * ) Notice: Subject to any disclaimer, the term of this patent is extended or adjusted under 35 U.S.C. 154(b) by 480 days.

(21) Appl. No.: 17/951,704

(22) Filed: Sep. 23, 2022

(51) Int. Cl.
*H04W 40/24* (2009.01)

(52) U.S. Cl.
CPC ....... *H04W 40/248* (2013.01); *H04W 40/244* (2013.01)

(58) Field of Classification Search
None
See application file for complete search history.

(56) References Cited

U.S. PATENT DOCUMENTS

2018/0108134 A1* 4/2018 Venable .................. G06T 7/521
2018/0232608 A1* 8/2018 Pradeep ............. G08B 13/1427
2020/0161889 A1* 5/2020 Lan ......................... H02J 50/20
2021/0035358 A1* 2/2021 King ....................... G06T 17/05
2023/0031145 A1* 2/2023 Narayanan ........... G06V 10/147
2023/0336371 A1* 10/2023 De ...................... H04L 61/5069

FOREIGN PATENT DOCUMENTS

CN 103999120 A * 8/2014 ......... G06F 16/9535
WO WO-2022149797 A1 * 7/2022

* cited by examiner

*Primary Examiner* — Jay L Vogel
(74) *Attorney, Agent, or Firm* — FLETCHER YODER PC

(57) ABSTRACT

The present disclosure relates to techniques for localizing devices connected to wireless networks, such as wireless mesh networks. In particular, a device connected to a wireless mesh network may maintain and share information, such as location data and identifiers, regarding the device and other devices connected to the device. The device itself or a computing system to which the device connects may determine locations for the devices in the wireless mesh network and generate a device map that indicates the locations of the devices.

20 Claims, 10 Drawing Sheets

SYSTEMS AND METHODS FOR GENERATING DEVICE MAPS OF WIRELESS MESH NETWORKS

BACKGROUND

The present disclosure relates generally to wireless communication, and more specifically to the operation of transmitters and receivers in wireless communication devices associated with wireless communication.

In an electronic device, a transmitter and a receiver may each be coupled to an antenna to enable the electronic device to both transmit and receive wireless signals. Electronic devices may communicate wirelessly in several types of networks and in accordance with several standards. One such type of network is a low-rate wireless personal area network (LR-WPANs), whose operation is defined in Institute of Electrical and Electronics Engineers (IEEE) Standard 802.15.4 (also known as "IEEE Standard for Low-Rate Wireless Networks"). IEEE Standard 802.15.4 provides the basis for several networking specifications, such as Zigbee, WirelessHART, 6LoWPAN, Thread, and SNAP.

One of the features of IEEE Standard 802.15.4 is beaconing, which may be used at various times, such as when electronic devices (which can also be called "nodes") seek to join a wireless network (e.g., to discover the network). In particular, a transmitter of an electronic device may transmit a beacon request, which may be a frame of data known as a beacon frame. Frames are the basic unit of data transport in IEEE Standard 802.15.4 networks. The transmitter may send beacon requests repeatedly, for instance, once or more over several channels (e.g., frequency ranges) of the wireless network. Other devices connected to the wireless network may respond to the beacon requests by transmitting beacons, which may be received by a receiver of the electronic device that had sent the beacon requests. However, by repeatedly transmitting signals, the electronic device may utilize bandwidth (e.g., time slots) of the wireless network that could otherwise be used, for instance, to transmit other frames of data through the wireless network. Furthermore, repeatedly transmitting signals may utilize an undesirable amount of electrical power available on a power source (e.g., a battery) of the electronic device.

Additionally, in wireless networks such as ultra-wideband networks, BLUETOOTH® networks, local area networks and wireless local area network, locations of devices within the networks may be determined or discovered using beaconing. However, there may be a relatively low number of devices connected to the network, which may lead to a relatively lower accuracy of the determined accuracy or the inability to share locations of devices included within a particular area or building, such as an office or residence.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to techniques for reducing network usage and power consumption by electronic devices connected to wireless networks, such as mesh wireless networks, that may utilize beaconing. For example, when in a beaconing mode of operation, the transmitter of an electronic device may repeatedly send wireless signals (e.g., beacon requests) over the wireless network, and devices connected to the wireless network may respond to the signals by transmitting signals (e.g., beacons) that may be received by a receiver of the electronic device. By repeatedly transmitting signals, the electronic device may utilize bandwidth (e.g., time slots) of the wireless network that could otherwise be used, for instance, to transmit data through the wireless network. Furthermore, repeatedly transmitting signals may utilize an undesirable amount of electrical power available on a power source (e.g., a battery) of the electronic device. To reduce power consumption and network traffic, a device may send a single beacon request over a wireless network, and devices in the wireless network may send beacons at a particular rate for a period of time. The particular rate and the period of time may be indicated in the single beacon request.

The present disclosure also relates to techniques for localizing devices connected to wireless networks, such as wireless mesh networks. In particular, a device connected to a wireless mesh network may maintain and share information, such as location data and identifiers, regarding the device and other devices connected to the device. The device itself or a computing system to which the device connects (e.g., a cloud computing system) may determine locations for the devices in the wireless mesh network and generate a device map that indicates the locations of the devices.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
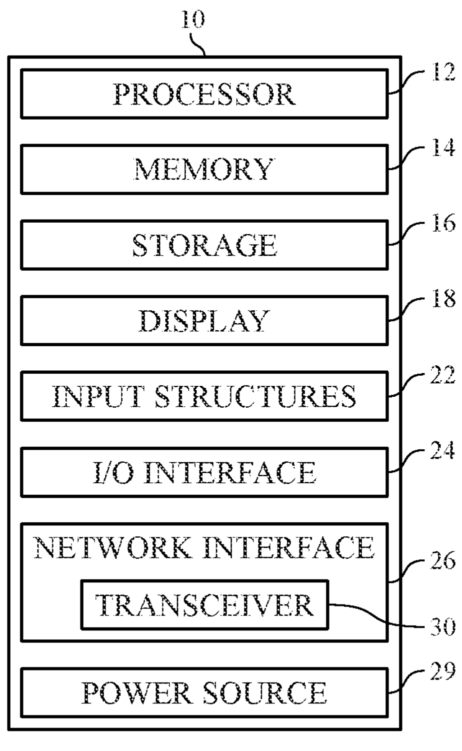
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

The present disclosure relates to techniques for reducing network usage and power consumption by electronic devices connected to wireless networks that employ beaconing, such as IEEE Standard 802.15.4 networks. For example, when in a beaconing mode of operation, the transmitter of an electronic device may repeatedly send wireless signals (e.g., beacon requests) over the wireless network, and devices connected to the wireless network may respond to the signals by transmitting signals (e.g., beacons) that may be received by a receiver of the electronic device. By repeatedly transmitting signals, the electronic device may utilize bandwidth (e.g., time slots) of the wireless network that could otherwise be used, for instance, to transmit data through the wireless network. Furthermore, repeatedly transmitting signals may utilize an undesirable amount of electrical power available on a power source (e.g., a battery) of the electronic device. To reduce power consumption and network traffic, a device may send a single beacon request over a wireless network, and devices in the wireless network may send beacons at a particular rate for a period of time. The particular rate and the period of time may be indicated in the single beacon request.

The present disclosure also relates to techniques for localizing devices connected to wireless networks, such as wireless mesh networks. As described below, a device connected to a wireless mesh network may maintain and share information, such as location data and identifiers, regarding the device and other devices connected to the device. The device itself or a computing system to which the device connects (e.g., a cloud computing system) may determine locations for the devices in the wireless mesh network and generate a device map that indicates the locations of the devices. As also discussed below, the device map may be generated by overlaying or otherwise combining two maps: a first map of the area in which the wireless network is included (e.g., a residence or office) and a second map showing the locations of the wireless devices relative to one another.

Keeping the foregoing in mind, FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), a smart speaker, home automation equipment (including, but not limited to switches, outlets, controllers, irrigation or sprinkler system equipment, sensors, lights, thermostats), wireless (or wired) routers, network extenders, or power equipment (e.g., controllers, power storage devices, solar panels)), a smart appliance (e.g., refrigerator, dishwasher, washer, dryer, etc.), a smart door lock and other similar devices. The electronic device 10 may also be any Thread-enabled router, device, or accessory capable of transmitting or receiving a beacon or a beacon request. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as a LR-WPAN or an ultra-wideband (UWB) or a BLUETOOTH® network, a local area network (LAN) or wireless local area network (WLAN), such as a network employing one of IEEE 802.11x family of protocols (e.g., WI-FI®), and/or a wide area network (WAN), such as any standards related to the Third Generation Partnership Project (3GPP), including, for example, a 3rd generation (3G) cellular network, universal mobile telecommunication system (UMTS), 4th generation (4G) cellular network, long term evolution (LTE®) cellular network, long term evolution license assisted access (LTE-LAA) cellular network, 5th generation (5G) cellular network, and/or New Radio (NR) cellular network, a satellite network, a non-terrestrial network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the electronic device 10 may include any suitable source of power, such as a rechargeable lithium polymer (Li-poly) battery and/or an alternating current (AC) power converter.

Figure 2:
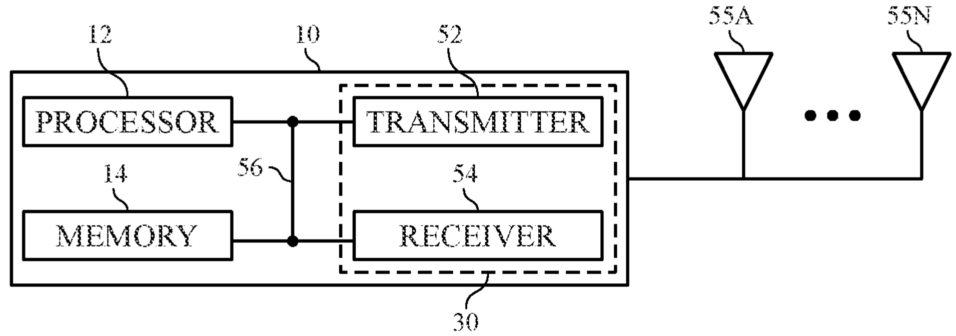
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on.

Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
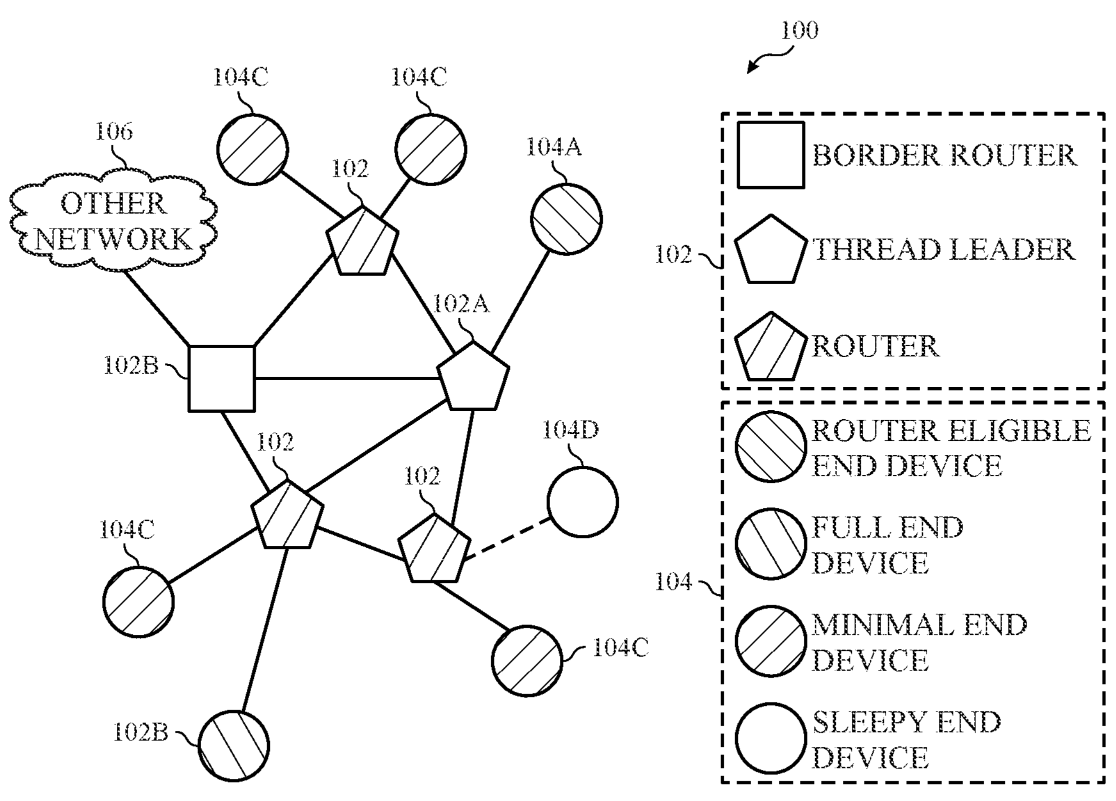
FIG. 3 is a schematic diagram of an IEEE Standard 802.15.4-based Thread network that may include the electronic device of FIG. 1 as a node, according to embodiments of the present disclosure.

FIG. 3 is a schematic diagram of a wireless network 100 in which the electronic device 10 may be connected. In particular, the wireless network 100 is a LR-WPAN, and, even more particularly, a Thread network. While the techniques described herein may be described with respect to the Thread network, it should be noted that the techniques may be utilized with other types of wireless networks, including, but not necessarily limited to, any IEEE Standard 802.15.4 network. For example, the techniques of the present disclosure may be utilized in wireless mesh networks, which generally refers to wireless networks that utilize a mesh topology. For instance, wireless mesh networks may follow a WLAN topology in which the nodes (e.g., devices connected to the mesh network) connect directly, dynamically, and non-hierarchically to other nodes (e.g., as many nodes as possible) and cooperate with one another to route data to and from devices. Wireless mesh networks include, but are not limited to, IEEE Standard 802.15.4 networks.

The wireless network 100 includes several nodes (e.g., routers 102 and end devices 104) that are connected to one another as illustrated in FIG. 3. Each of the nodes is an electronic device included in the wireless network 100. As illustrated, there are several types of nodes in the wireless network 100. Depending on the capabilities of the electronic device 10, the electronic device 10 may be one or more of any of the types of nodes. The particular types of nodes included in the wireless network 100 include routers 102 (collectively referring to routers 102 (e.g., routers that are not further classified as discussed below), thread leader 102A, and border router 102B) and end devices 104 (collectively referring to end devices 104A, 104B, 104C, 104D). Routers 102 are nodes that forward packets for network devices, provide secure commissioning services for devices attempting to join the wireless network 100, and keep their transceiver(s) enabled at all times. End devices 104 are nodes that do not forward packets for other network devices, communicate (primarily) with a single router 102, and may disable their transceiver(s) to reduce power. As discussed below, routers 102 and some end devices 104 may also be classified as full Thread devices, while other end devices may be classified as minimal Thread devices. A full Thread device may always have its radio on, maintain IPv6 address mappings, and subscribe to an all-routers multicast address. Minimal Thread devices may not subscribe to the all-routers multicast address and forward their messages to a router 102 (or an end device 104 that is functioning as a router 102).

Within the classification of routers 102, there may be several types of routers 102. For example, a router 102 may be a thread leader 102A, which manages the other routers in the wireless network 100. A router 102 may also be a border router 102B, which is a device that can forward data to another network 106, such as a network other than a Thread network (e.g., a Wi-Fi® network). Routers 102 are full Thread devices.

Within the classification of end devices 104, there are router eligible end devices 104A, full end devices 104B, minimal end devices 104C, and sleepy end devices 104D. Router eligible end devices 104A and full end devices 104B are full Thread devices. More specifically, router eligible end devices 104A are end devices 104 that can be promoted to function as a router 102, while full end devices 104B are end devices 104 that are full Thread devices but cannot be promoted to be a router 102. Minimal end devices 104C and sleepy end devices 104D are minimal Thread devices. In particular, a minimal end device 104C does not need to poll for messages sent from the router 102 to which the minimal end device 104C is connected, and the minimal end device's 104C transceiver is always on. A sleepy end device 104D is an end device 104 that is typically in sleep and wakes up occasionally to poll for messages from the router 102 to which it is connected.

The wireless network 100 may be implemented indoors (e.g., within a dwelling or office space), outdoors, or both. The nodes may include electrical devices including, but not limited to, the electronic devices listed above that the electronic device 10 may be. For instance, the nodes (which include the electronic device 10) may be a phone, tablet, computer, a portable electronic or handheld electronic, a wearable electronic device, a smart speaker, home automation equipment (including, but not limited to switches, outlets, controllers, irrigation or sprinkler system equipment, sensors, lights, thermostats), wireless routers, network extenders, or power equipment), a smart appliance (e.g., refrigerator, dishwasher, washer, dryer, etc.), a smart door lock or any combination thereof. The nodes may be any Thread-enabled router, device, or accessory capable of transmitting or receiving a beacon or a beacon request.

Adaptive Beaconing

Figure 4:
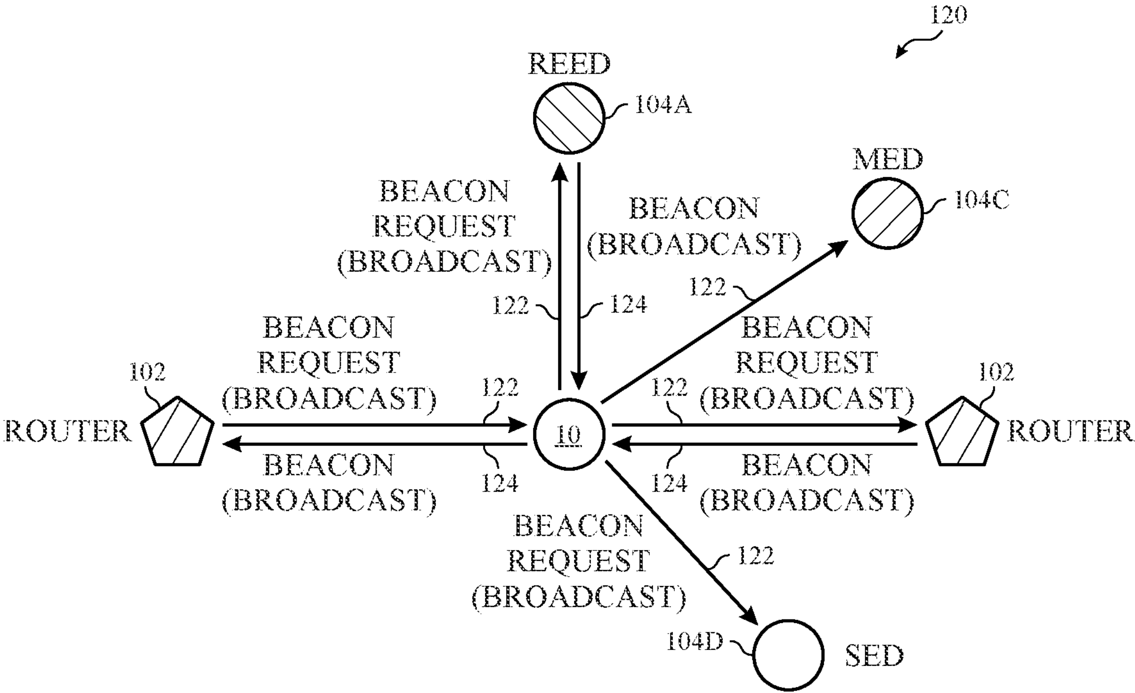
FIG. 4 is a schematic diagram of another IEEE Standard 802.15.4-based Thread network that may include the electronic device of FIG. 1 as a node, according to embodiments of the present disclosure.

The present disclosure relates to techniques for reducing power consumption by electronic devices and network traffic on wireless networks, such as the wireless network 100. Bearing this in mind, FIG. 4 is a schematic diagram of a wireless network 120 that includes the electronic device 10. In particular, the wireless network 120 may include a LR-WPAN, and, even more particularly, a Thread network. While the techniques described herein may be described with respect to the Thread network, it should be noted that the techniques may be utilized with other types of wireless networks, including, but not necessarily limited to, wireless mesh networks and any IEEE Standard 802.15.4 network.

Similar to the wireless network 100, the wireless network 120 includes several nodes that are connected to one another as illustrated FIG. 4. In particular, the nodes include the electronic device 10, routers 102, router eligible end device 104A, minimal end device 104C, and sleepy end device 104D. In other embodiments, other types of routers 102 or devices 104 may be included in the wireless network 120. As described above, devices (e.g., nodes) in wireless networks such as IEEE Standard 802.15.4 networks may utilize beaconing. For example, when operating in one mode of operation (e.g., a beaconing mode of operation), the transmitter 52 of the electronic device 10 may transmit beacon requests 122 (e.g., wireless signals) over the wireless network 120. Nodes (e.g., routers 102 and the router eligible end device 104) connected to the electronic device 10 may respond to the beacon requests 122 by transmitting beacons 124. The receiver 54 of the electronic device 10 may receive the beacons 124.

The electronic device 10 may utilize the beaconing mode of operation, for example, when discovering or connecting to the wireless network 120 and to time-synchronize devices connected to the wireless network 120. The beaconing mode of operation may also be utilized by the processor 12 of the electronic device 10 to determine the location of the electronic device 10 based on the received beacons 124. In particular, beacons 124 may include data regarding the wireless network 120, identifiers for the devices sending the beacons 124, capability data, and/or an identifier (e.g., a service set identifier (SSID) indicative of a group of devices sharing the wireless network 120).

The beacons 124 may also be indicative of a location of the transmitting device and/or a location of the electronic device 10. For example, the location of the electronic device 10 indicated by each beacon 124 may be relative to the device transmitting the beacon 124. As such, the processor 12 of the electronic device 10 may determine a location of the electronic device 10, for example, by triangulation or another form of processing the relative locations indicated by several beacons 124. Furthermore, the location of the electronic device 10 may be maintained by one or more routers (e.g., routers 102) to which the electronic device 10 is communicatively coupled, and the routers 102 may register the location of the electronic device 10 as a radio frequency fingerprint (e.g., a universal unique identifier (UUID)) associated with the electronic device 10 that may be updated as the electronic device 10 communicates with the routers 102. The location may be a particular area or room within a building or residence, and the location may also include (or be) an indication of the signal strength between the electronic device 10 and the router 102 that sends the beacon 124. As such, each beacon 124 may include data indicative of the location of the electronic device 10, and the processor 12 may determine the location of the electronic device 10 based on the received beacons 124.

In the beaconing mode of operation, the electronic device 10 may transmit the beacon requests 122 repeatedly across several channels (e.g., frequency ranges) of the wireless network 120 and receive multiple beacons 124 from each node capable of doing so or configured to do so (e.g., the routers 102 and the router eligible end device 104A). Accordingly, the electronic device 10 may repeatedly transmit signals (e.g., the beacon requests 122) when operating in the beaconing mode of operation. However, by repeatedly transmitting signals, the electronic device 10 may utilize bandwidth (e.g., time slots) of the wireless network 120 that could otherwise be used, for instance, to transmit data through the wireless network 120. Moreover, repeated use of the transceiver 30 (e.g., to transmit the beacon requests 122) may cause the electronic device 10 to consume an undesirable amount of electrical power available on the power source 29 of the electronic device 10, especially in embodiments of the electronic device 10 in which the power source 29 is a battery.

To reduce power consumption and network traffic, the electronic device 10 may utilize another mode of operation, which may be referred to as "adaptive beaconing" or "continuous location mode." When utilizing adaptive beaconing, the transmitter 52 of the electronic device 10 may send a single beacon request 122 over a wireless network (e.g., the wireless network 120), and devices in the wireless network 120 may send beacons 124 at a particular rate for a period of time. In other words, rather than sending multiple beacon requests 122 and receiving multiple beacons 124 as described above in the beaconing mode of operation, when utilizing adaptive beaconing, the electronic device 10 may send one beacon request 122 through the network 120 and receive multiple beacons 124 from each device that transmits beacons 124. As such, relative to the beaconing mode of operation, the electronic device 10 may consume less available power of the power source 29, and the amount of data communicated across the wireless network 120 may be reduced.

In adaptive beaconing, the beacon request 122 may specify parameters such as a rate at which the devices that transmit the beacons 124 and a timeout period, which is a duration of time that the devices that transmit the beacons are to transmit the beacons 124. For instance, there may be a default rate and a default timeout period (e.g., one minute or less, two minutes or less, three minutes or less, four minutes or less, five minutes or less, five minutes or more, or any other suitable amount of time), which may be indicated by the beacon request 122. As discussed below, in some instances, the processor 12 may determine to utilize a different rate and/or timeout period or even modify the rate or duration of the timeout period after the timeout period has begun (e.g., after transmitting the beacon request). As also discussed below, the electronic device 10 may switch from operating in one mode of operation (e.g., the beaconing mode of operation or another mode of operation that may be utilized to transmit or receive data) to operating using adaptive beaconing in response to the processor 12 receiving an indication or request from an application executed by the processor 12 for a continuous location of the electronic device.

Figure 5:
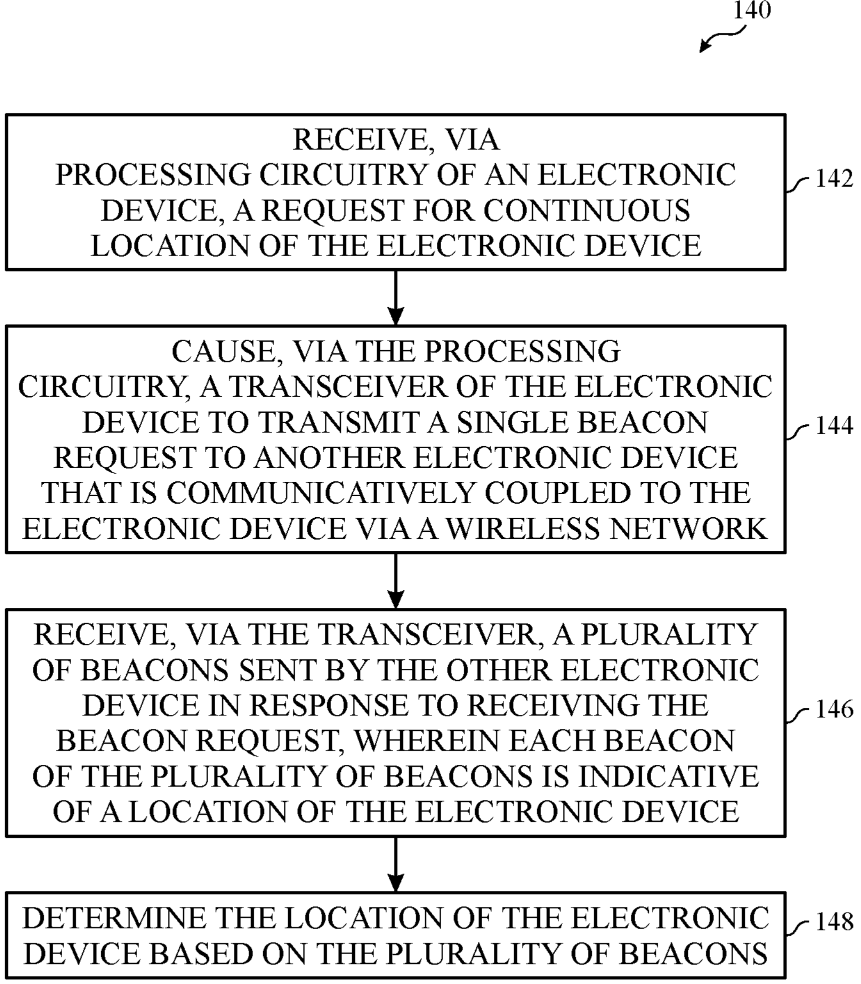
FIG. 5 is a flow diagram of a process for operating the electronic device of FIG. 1 in a continuous location mode of operation, according to embodiments of the present disclosure.

Keeping this in mind, FIG. 5 is a flow diagram of a process 140 for operating the electronic device 10 in the continuous location mode. Any suitable device (e.g., a controller) that may control components of the electronic device 10, such as the processor 12 or the transceiver 30, may perform the process 140. In some embodiments, the process 140 may be implemented by executing instructions stored in a tangible, non-transitory, computer-readable medium, such as the memory 14 or storage 16, using the processor 12 or transceiver 30. For example, the process 140 may be performed at least in part by one or more software components, such as an operating system of the electronic device 10, one or more software applications of the electronic device 10, and the like. While the process 140 is described using steps in a specific sequence, it should be understood that the present disclosure contemplates that the described steps may be performed in different sequences than the sequence illustrated, and certain described steps may be skipped or not performed altogether.

In process block 142, the processor 12 may receive (e.g., via the transceiver 30) a request for a continuous location of the electronic device 10. For instance, the processor 12 may execute a software application that sends the request for the continuous location of the electronic device 10. More specifically, the request for the continuous location may be a request for the location of the electronic device 10 for a certain (potentially pre-determined) amount of time, or the request may stay active while a user is interacting with the application. For example, the application may stream audio data, video data, and/or photos and/or cast such data between the electronic device 10 and other devices connected to the same wireless network (e.g., the wireless network 120). While running the application, the user may select which of the other devices to send content to so that the content will be displayed on the other device. In such a case, the application may utilize the location of the electronic device 10, for instance, to determine which devices are closest to the electronic device 10 and therefore more likely to be the device on which the user desires the content to be displayed. The application may then display a list of available devices, and the device nearest to the electronic device 10 being listed first. In such a case, the request for continuous location may remain active until the user selects the device to which content is to be streamed.

In process block 144, the processor 12 may cause the transceiver 30 to transmit a single beacon request 122 to another electronic device that is communicatively coupled to the electronic device 10 via a wireless network (e.g., wireless network 120). In particular, the transceiver 30 may transmit the beacon request 122 through the wireless network 120, and one or more of the devices connected to the wireless network 120 (e.g., routers 102 and end devices 104) may receive the beacon request 122. As noted above, the beacon request 122 may be indicative of a timeout period (e.g., a duration of time) during which devices that receive the beacon request 122 are to transmit the beacons 124. The beacon request may also be indicative of a rate (i.e., how frequently) the devices that receive the beacon request are to transmit the beacons 124.

In process block 146, the processor 12 may receive (via the transceiver 30) the beacons 124 that are sent by another device in the wireless network 120 (e.g., one of the routers 102 or the router eligible end device 104A) in response to receiving the beacon request 122. As discussed above, each of the beacons 124 transmitted by the other device may be indicative of the location of the electronic device 10.

In process block 148, the processor 12 may determine the location of the electronic device 10 based on the beacons 124 received at process block 146. For example, as noted above, the beacon 124 may include data associated with the electronic device 10 (e.g., a device identifier) which may be indicative of, or associated with, a location of the electronic device 10 as determined by the device that sends the beacons 124 (e.g., one of the routers 102 or the router eligible end device 104A). In other words, the beacon 124 may include data that the processor 12 may translate to a location of the electronic device 10. In this manner, the process 140 enables the processor 12 to determine the location of the electronic device 10 in a manner that causes less traffic on the wireless network 120 and saves power of the power source 29 relative to operating in the beaconing mode of operation.

Figure 6:
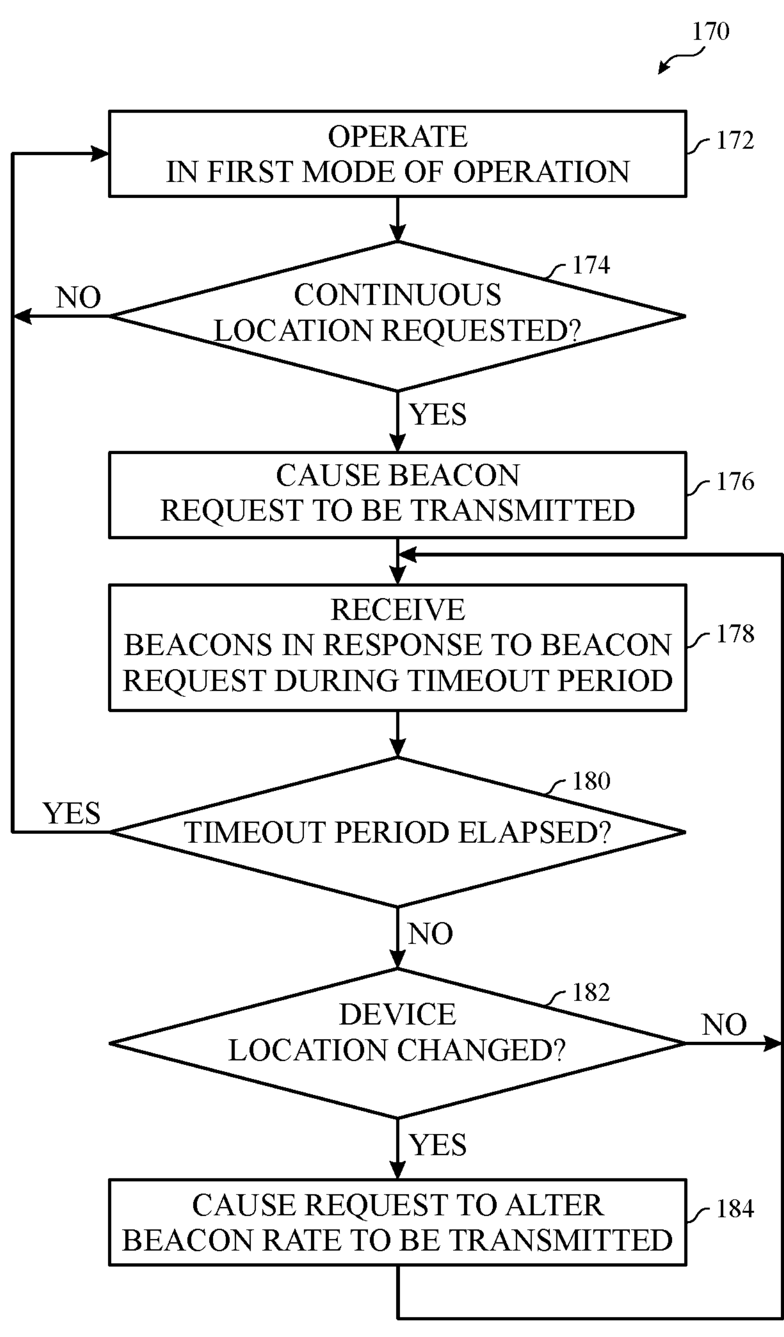
FIG. 6 is a flow diagram of another process for operating the electronic device of FIG. 1 in a continuous location mode of operation, according to embodiments of the present disclosure.

Before proceeding to discuss FIG. 6, it should be noted that the processor 12 may receive beacons 124 transmitted by several devices in the wireless network 120 while performing the process 140 (e.g., in process block 146), and that the processor 12 may determine the location of the electronic device 10 based on the beacons 124 received from more than one of the electronic devices in the wireless network 120 with the electronic device 10.

FIG. 6 is a flow diagram of a process 170 for operating in the continuous location mode and switching between operating in the continuous location mode and another mode of operation. Any suitable device (e.g., a controller) that may control components of the electronic device 10, such as the processor 12 or the transceiver 30, may perform the process 170. In some embodiments, the process 170 may be implemented by executing instructions stored in a tangible, non-transitory, computer-readable medium, such as the memory 14 or storage 16, using the processor 12 or transceiver 30. For example, the process 170 may be performed at least in part by one or more software components, such as an operating system of the electronic device 10, one or more software applications of the electronic device 10, and the like. While the process 170 is described using steps in a specific sequence, it should be understood that the present disclosure contemplates that the described steps may be performed in different sequences than the sequence illustrated, and certain described steps may be skipped or not performed altogether.

In process block 172, the processor 12 may operate in a first mode of operation. The first mode of operation may include the beaconing mode of operation or any other mode of operation other than the continuous location mode of operation.

In decision block 174, the processor 12 may determine whether continuous location of the electronic device 10 has been requested. The processor 12 may determine that a continuous location of the electronic device 10 has been requested in response to receiving a request from an application executed by the processor 12 for the continuous location of the electronic device 10. The processor 12 may determine that the continuous location of the electronic device 10 has not been requested based on the absence of a request for the continuous location. Upon determining that the continuous location of the electronic device 10 has not been requested, the process 170 may return to process block 172, and the processor 12 may continue to operate in the first mode of operation.

However, if the processor 12 determines in decision block 174 that the continuous location of the electronic device 10 has been requested, in process block 176, the processor 12 may cause the transceiver 30 to transmit a single beacon request 122, for instance, throughout the wireless network 120. In other words, in response to determining that the continuous location of the electronic device 10 has been requested, the processor 12 may switch from operating in the beaconing mode to operating in the continuous location mode and transmit the single beacon request 122 described above. The beacon request 122 may indicate the timeout period during for which devices that receive the beacon request 122 are to transmit the beacons 124. The beacon request may also be indicative of a rate (i.e., how frequently) the devices that receive the beacon request are to transmit the beacons 124.

In process block 178, the processor 12 may receive, via the transceiver 30, beacons 124 that are sent by other devices connected to the wireless network 120 (e.g., routers 102 and router eligible end device 104A). As noted above, each of the devices may transmit multiple beacons 124 at the rate indicated by the beacon request 122 during the timeout period indicated by the beacon request 122. Accordingly, the processor 12 may receive multiple beacons from each device that transmits the beacons 124 via the wireless network 120.

In decision block 180, the processor 12 may determine whether the timeout period has elapsed. In other words, the processor 12 may determine whether the period of time during which other devices are to transmit the beacons 124 has expired. Upon determining that the timeout period has elapsed, the process 170 may return to process block 172, and the processor 12 may operate in the first mode of operation (or any other mode of operation other than the continuous location mode). That is, the processor 12 may switch from operating in the continuous location mode to operating in another mode of operation.

However, if in decision block 180 the processor 12 determines that the timeout period has not elapsed, in decision block 182, the processor 12 may determine whether the location of the electronic device 10 has changed. The processor 12 may determine that the location of the electronic device 10 has changed based on data received from one or more sensors included in the electronic device 10 that are communicatively coupled to the processor 12. The sensors may include one or more accelerometers, infrared image sensors, light detection and ranging (LiDAR) sensors, or a combination thereof. Alternatively, the processor 12 may determine that the location of the electronic device 10 has changed based on determining that the location indicated by the beacons 124 has changed or that the transceiver 30 is no longer receiving the beacons 124. Because the timeout period has not expired, the transceiver 30 may not receive beacons 124 when the location of the electronic device 10 changes because the electronic devices nearer to the new location of the electronic device 10 may not have received the beacon request 122. When the processor 12 determines that the location of the electronic device 10 has not changed, the process 170 may return to process block 178, and the processor 12 may continue to receive beacons 124 from devices in the wireless network 120.

Conversely, if in decision block 182 the processor 12 determines that the location of the electronic device 10 has changed, in process block 184, the processor 12 may cause the transceiver 30 to transmit a request to alter the rate at which devices are to transmit the beacons 124. The request may include another beacon request 122 that indicates the altered rate at which device of the wireless network 120 is to transmit the beacons 124. Additionally or alternatively to altering the rate at which the beacons 124 are to be transmitted, the processor 12 may cause the timeout period to be altered or reset. For example, in embodiments in which another beacon request 122 is to be transmitted, the beacon request 122 may indicate the same timeout period or a different timeout period (e.g., a shorter timeout period) than the beacon request 122 sent in process block 176. When the location of the electronic device 10 changes, the electronic device 10 may be connected to the wireless network 120 via one or more routers 102 that differ from the routers 102 to which the electronic device 10 was connected when the beacon request 122 was sent (in process block 176). As such, when the electronic device 10 is moved to a different location within the wireless network 120, the electronic device 10 may no longer be receiving the beacons 124 during the timeout period, or the electronic device 10 may receive the beacons 124 from fewer devices (e.g., routers 102) than before. Altering the rate at which the beacons 124 are to be sent and/or altering the timeout period (e.g., by sending a new beacon request 122) may therefore enable the electronic device 10 to continue to receive the beacons 124 that the processor 12 may utilize to determine the location of the electronic device 10. After performing the operations associated with process block 184, the process 170 may return to process block 178, and the processor 12 may continue to receive beacons 124. In this manner, the process 170 enables the processor 12 to determine the location of the electronic device 10 in a manner that causes less traffic on the wireless network 120 and saves power of the power source 29 relative to operating in the beaconing mode of operation.

Figure 7:
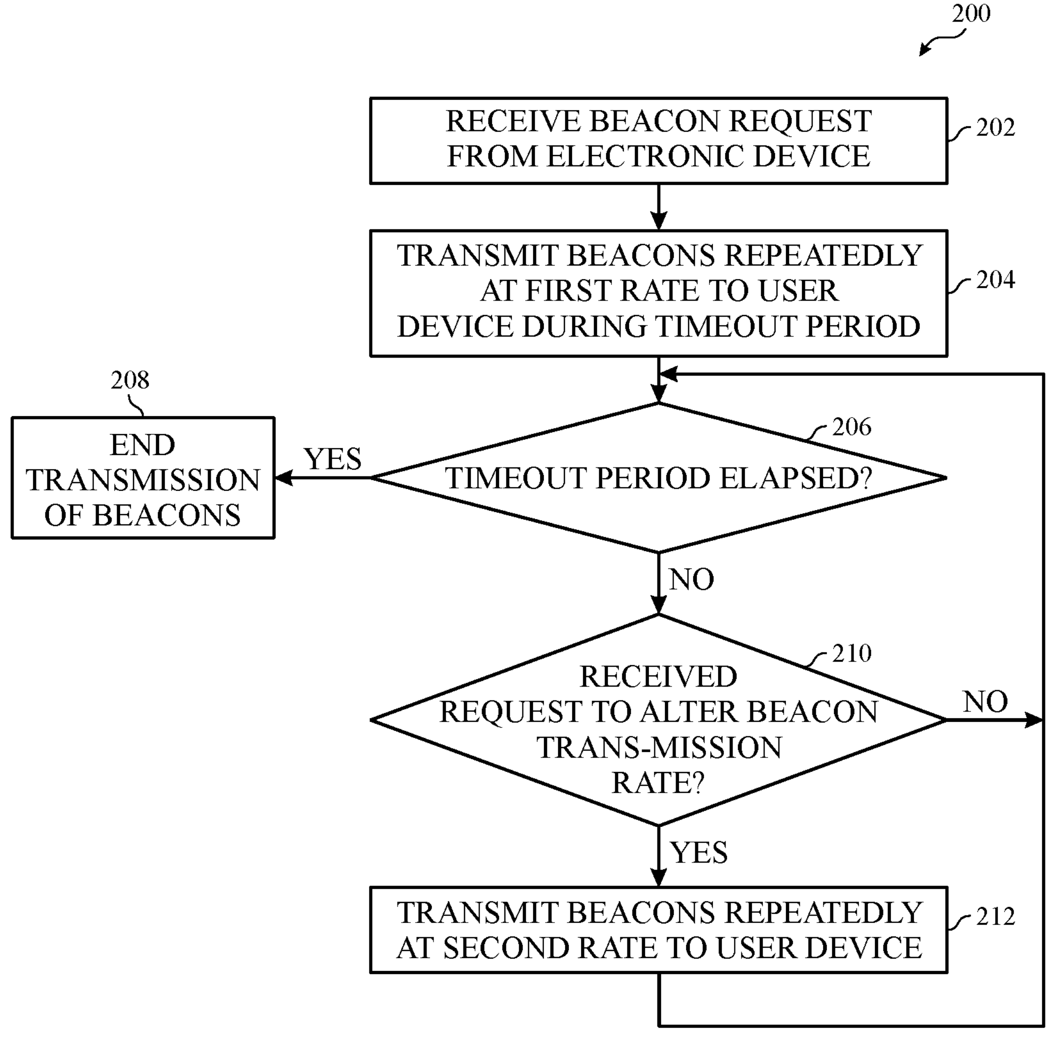
FIG. 7 is a flow diagram of a process for responding to a beacon request sent by a device operating in a continuous location mode of operation, according to embodiments of the present disclosure.

While operating in the continuous location mode of operation has largely been described above with respect to the electronic device 10 that transmits the beacon request 122, FIG. 7 is provided to describe operations that may be performed in response to receiving the beacon request 122. In particular, FIG. 7 is a flow diagram of a process 200 for responding to a beacon request 122 (e.g., that is transmitted by a device operating in the continuous location mode). Any suitable device (e.g., a controller) that may control components of the electronic device 10, such as the processor 12 or the transceiver 30, may perform the process 200. In some embodiments, the process 200 may be implemented by executing instructions stored in a tangible, non-transitory, computer-readable medium, such as the memory 14 or storage 16, using the processor 12 or transceiver 30. For example, the process 200 may be performed at least in part by one or more software components, such as an operating system of the electronic device 10, one or more software applications of the electronic device 10, and the like. In one embodiment, the process 200 may be performed by the electronic device 10 (and components thereof) when the electronic device 10 is a router 102 or a router eligible end device 104A within the wireless network 120. Furthermore, while the process 200 is described using steps in a specific sequence, it should be understood that the present disclosure contemplates that the described steps may be performed in different sequences than the sequence illustrated, and certain described steps may be skipped or not performed altogether.

In process block 202, the processor 12 may receive (via the transceiver 30) a beacon request 122 from another electronic device in the wireless network 120. The beacon request 122 may be transmitted by the other electronic device while operating in the continuous location of operation. Accordingly, in response to receiving the beacon request, in process block 204, the processor 12 may cause the transceiver 30 to transmit beacons 124 repeatedly at a first rate during a timeout period. The first rate and/or the timeout period may be indicated by the beacon request 122 received in process block 202. However, when the beacon request 122 does not indicate the first rate and or the timeout period, the processor 12 may utilize a default rate or default time period associated with the continuous location mode of operation. In some embodiments, the default rate or the default time period may be configured or set by a user.

In decision block 206, the processor 12 may determine whether the timeout period has elapsed. In response to determining the timeout period has elapsed, in process block 208, the processor 12 may cause the transceiver 30 to stop transmitting the beacons 124. That is, when the timeout period has expired, the processor 12 may cause the electronic device 10 to no longer transmit the beacons 124.

However, if, in decision block 206, the processor 12 determines that the timeout period has not elapsed, in decision block 210, the processor 12 may determine whether the processor 12 has received (via the transceiver 30) a request to alter the first rate at which the electronic device 10 is transmitting the beacons 124. The request may include another beacon request 122 sent by the electronic device that sent the beacon request 122 received at process block 202. Additionally or alternatively, at decision block 206, the processor 12 may determine whether the processor 12 has received (via the transceiver 30) a request to alter or reset the timeout period, which may also be indicated by a new beacon request 122. If the processor 12 determines at decision block 210 that the processor 12 has not received such a request (e.g., a request to alter the first rate at which the electronic device 10 is transmitting the beacons 124, alter or reset the timeout period, or both), the process 200 may return to decision block 206, and the processor 12 may determine whether the timeout period has elapsed.

Conversely, if the processor 12 determines at decision block 210 that the processor 12 has received such a request (e.g., a request to alter the first rate at which the electronic device 10 is transmitting the beacons 124, alter or reset the timeout period, or both), in process block 212, the processor 12 may transmit beacons in accordance with the request. For instance, if the request is to alter the first rate (e.g., to a second rate) at which the electronic device 10 is to transmit the beacons 124, then the processor 12 may cause the transceiver 30 to transmit the beacons 124 at the second rate. If the request is to alter or reset the timeout period, then the processor 12 may account for the altered or reset timeout period and cause the beacons 124 to be transmitted by the transceiver 30 for a duration equal to the altered or reset time period at the first rate (e.g., when the request is only to alter or reset the timeout period) or at the second rate (e.g., when the request is both 1) to alter the rate at which the beacons 124 are to be transmitted and 2) to alter or reset the timeout period).

By utilizing the continuous location mode operation, power consumed by the electronic device 10 may be reduced compared to modes of operation in which beacon requests are transmitted repeatedly. Furthermore, utilizing the continuous location mode of operation may reduce the amount of data transmitted over the wireless network 120, thereby enabling the bandwidth of the network 120 to be utilized to communicate other data.

In an embodiment, a first electronic device may include a transceiver configured to transmit and receive wireless signals. The first electronic device may also include processing circuitry operatively coupled to the transceiver and be configured to transmit, via the transceiver, a single beacon request to a second electronic device that is communicatively coupled to the first electronic device via a wireless mesh network. The processor may also be configured to receive, via the transceiver, a plurality of beacons sent by the second electronic device via the wireless mesh network, wherein each beacon of the plurality of beacons is indicative of a location of the first electronic device.

The processing circuitry may be configured to operate in a continuous location mode during a timeout period, wherein in the continuous location mode, the processing circuitry is configured to transmit the single beacon request via the transceiver and receive the plurality of beacons via the transceiver. The single beacon request may be indicative of the timeout period.

The processing circuitry may be configured to receive a request from an application executed by the processing circuitry and operate in the continuous location mode based on the request.

The processing circuitry may be configured to determine whether the timeout period has elapsed and, upon determining that the timeout period has elapsed, operate in another mode of operation different than the continuous location mode.

The single beacon request may be indicative of a beacon rate at which the second electronic device is to transmit successive beacons of the plurality of beacons.

The processing circuitry may be configured to determine whether the location of the electronic device has changed and, in response to determining the location of the electronic device has changed, cause the transceiver to transmit a request to alter the beacon rate from a first rate to a second rate.

The first electronic device may include a motion sensor operatively coupled to the processing circuitry and configured to detect movement of the electronic device. The processing circuitry may be configured to determine that the location of the electronic device has changed based on data received from the motion sensor.

The wireless mesh network may be an Institute of Electrical and Electronics Engineers (IEEE) Standard 802.15.4 network. The wireless mesh network may be a Thread network.

In another embodiment, a non-transitory computer-readable medium may include instructions that, when executed by processing circuitry of a first electronic device, cause the processing circuitry to transmit, via a transceiver of the first electronic device, a single beacon request to a second electronic device that is communicatively coupled to the first electronic device via a wireless mesh network. When executed, the instructions may also cause the processing circuitry to determine a location of the first electronic device based on a plurality of beacons sent by the second electronic device via the wireless mesh network, wherein each beacon of the plurality of beacons is indicative of a location of the first electronic device.

The instructions, when executed, may cause the processing circuitry to operate in a continuous location mode during a timeout period in response to receiving a request from an application executed by the processing circuitry. In the continuous location mode, the processing circuitry may be configured to transmit the single beacon request via the transceiver and receive the plurality of beacons via the transceiver.

The single beacon request may be indicative of the timeout period, a beacon rate at which the second electronic device is to transmit successive beacons of the plurality of beacons, or both the timeout period and the beacon rate.

The instructions, when executed, may cause the processing circuitry to determine whether the timeout period has elapsed, and, upon determining the timeout period has elapsed, operate in another mode of operation different than the continuous location mode. The instructions, when executed, may cause the processing circuitry to, upon determining the timeout period has not elapsed, determine whether the location of the electronic device has changed, and, in response to determining the location of the electronic device has changed, cause the transceiver to transmit a request to alter the beacon rate from a first rate to a second rate.

The wireless mesh network may be a low-rate wireless personal area network (LR-WPAN).

In yet another embodiment, a first electronic device may include a transceiver configured to transmit and receive data as well as processing circuitry operatively coupled to the transceiver. The processing circuitry may be configured to receive, via the transceiver, a single beacon request from a second electronic device that is communicatively coupled to the first electronic device via a wireless mesh network. The processing circuitry may also be configured to, in response to receiving the single beacon request, transmit, via the transceiver, a plurality of beacons via the wireless mesh network, wherein each beacon of the plurality of beacons is indicative of a location of the second electronic device.

The processing circuitry may be configured to transmit each successive beacon of the plurality of beacons at a first rate during a timeout period.

The processing circuitry may be configured to determine whether the timeout period has elapsed and, in response to determining the timeout period has elapsed, cease transmission of the plurality of beacons.

The processing circuitry may be configured to, in response to determining the timeout period has not elapsed, determine whether the processing circuitry has received, via the transceiver, a request from the second electronic device to transmit successive beacons of the plurality of beacons at a second rate that is different than the first rate. In response to determining the processing circuitry has received the request, the processing circuitry may be configured to transmit, via the transceiver, successive beacons of the plurality of beacons at the second rate.

The single beacon request may be indicative of the timeout period, the first rate, or both the timeout period and the first rate.

Mapping Devices in Wireless Mesh Networks

The present disclosure also relates to techniques for localizing devices connected to wireless networks, such as wireless mesh networks. As described below, a device connected to a wireless mesh network may maintain and share information, such as location data and identifiers, regarding the device and other devices connected to the device. The device itself or a computing system to which the device connects (e.g., a cloud computing system) may determine locations for the devices in the wireless mesh network and generate a device map that indicates the locations of the devices. As also discussed below, the device map may be generated by overlaying or otherwise combining two maps: a first map of the area in which the wireless network is included (e.g., a residence or office) and a second map showing the locations of the wireless devices relative to one another.

Figure 8:
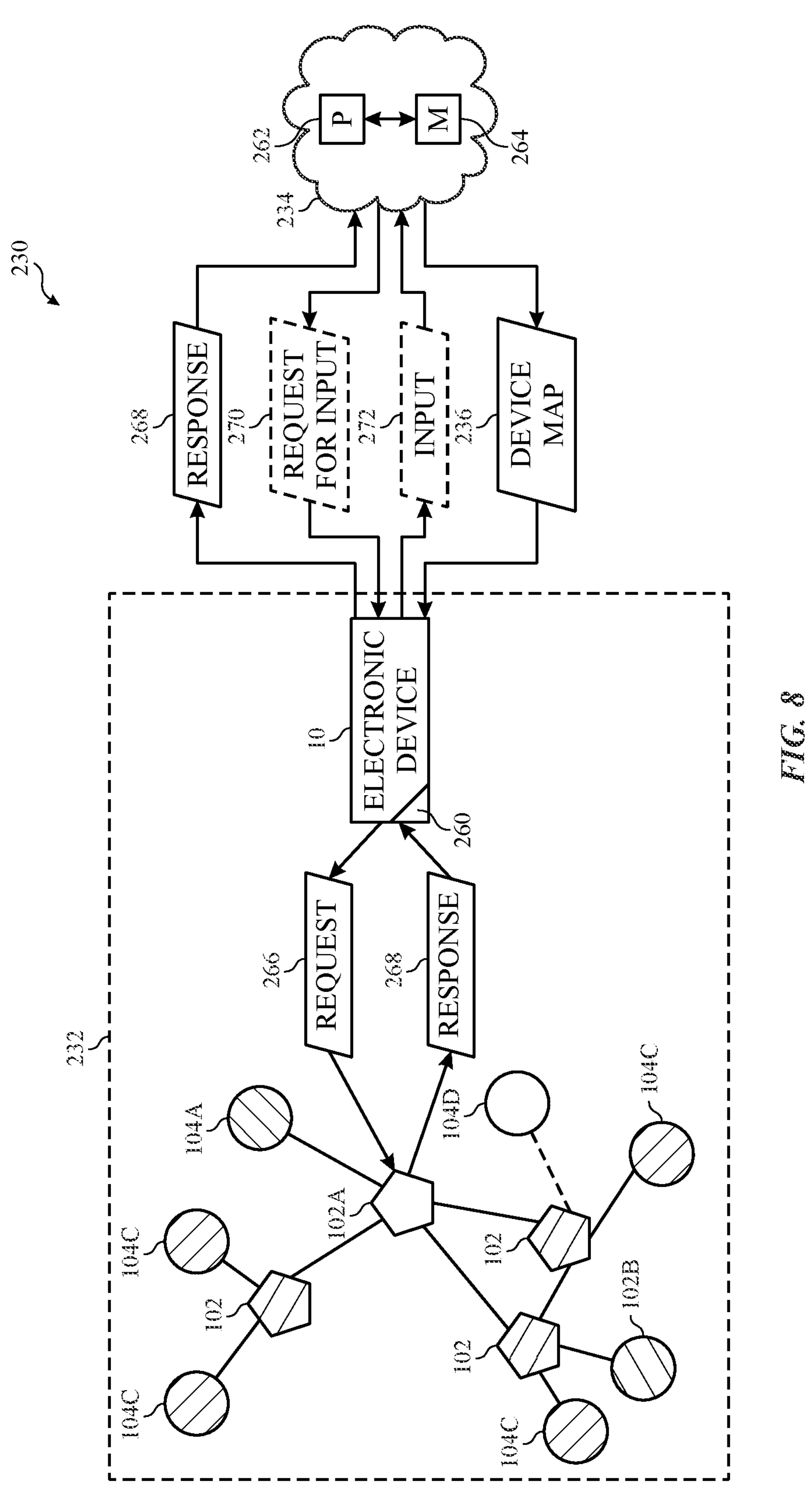
FIG. 8 is a block diagram of a system that may generate a device map of electronic devices included in a wireless network, according to embodiments of the present disclosure.

Bearing this in mind, FIG. 8 is a block diagram of a system that, as illustrated, includes a wireless network 232, the electronic device 10, and a cloud computing system 234. As will be described below, the system 230 may generate a device map 236 of the devices of the wireless network 232, and the device map 236 may be displayed on the display 18 of the electronic device 10. Before describing FIG. 8 in more detail, it should be noted that the cloud computing system 234 may be an on premise computing device or system. That is, the cloud computing system 234 may be a computing device or system that is located in the same location (e.g., residence or building) as the electronic device 10 and/or wireless network 232 or a different location than the electronic device 10 and/or wireless network 232.

The wireless network 232 may be a LR-WPAN, and, even more particularly, a Thread network. While the techniques described herein may be described with respect to the Thread network, it should be noted that the techniques may be utilized with other types of wireless networks, including, but not necessarily limited to, wireless mesh networks and any IEEE Standard 802.15.4 network.

The wireless network 232 includes several nodes (e.g., routers 102, end devices 104, and the electronic device 10) that are connected to one another as illustrated in FIG. 8. As illustrated, there are several types of nodes in the wireless network 232. The particular types of nodes included in the wireless network 232 include routers 102 (collectively referring to routers 102 (e.g., routers that are not further classified), and the thread leader 102A) and end devices 104 (collectively referring to end devices 104A, 104B, 104C, 104D). The routers 102 and devices 104 may function as described above with respect to FIG. 3.

Compared to other types of wireless networks such as WLAN or BLUETOOTH® networks, mesh networks such as the wireless network 232 may have a higher density of electronic devices (e.g., nodes), which may help enable the device map 236 to be generated by utilizing data that may be maintained by the routers 102 that may be spread throughout a particular area, such as a residence or office. That is, by utilizing data maintained (or that can be determined) by routers 102 that may be spread throughout a particular area, the locations of the devices (e.g., nodes) within the wireless network (and, thus, the particular area), may be determined and used to generate the device map 236 that may visually represent the nodes of the wireless network 232 within the particular area.

Figure 9:
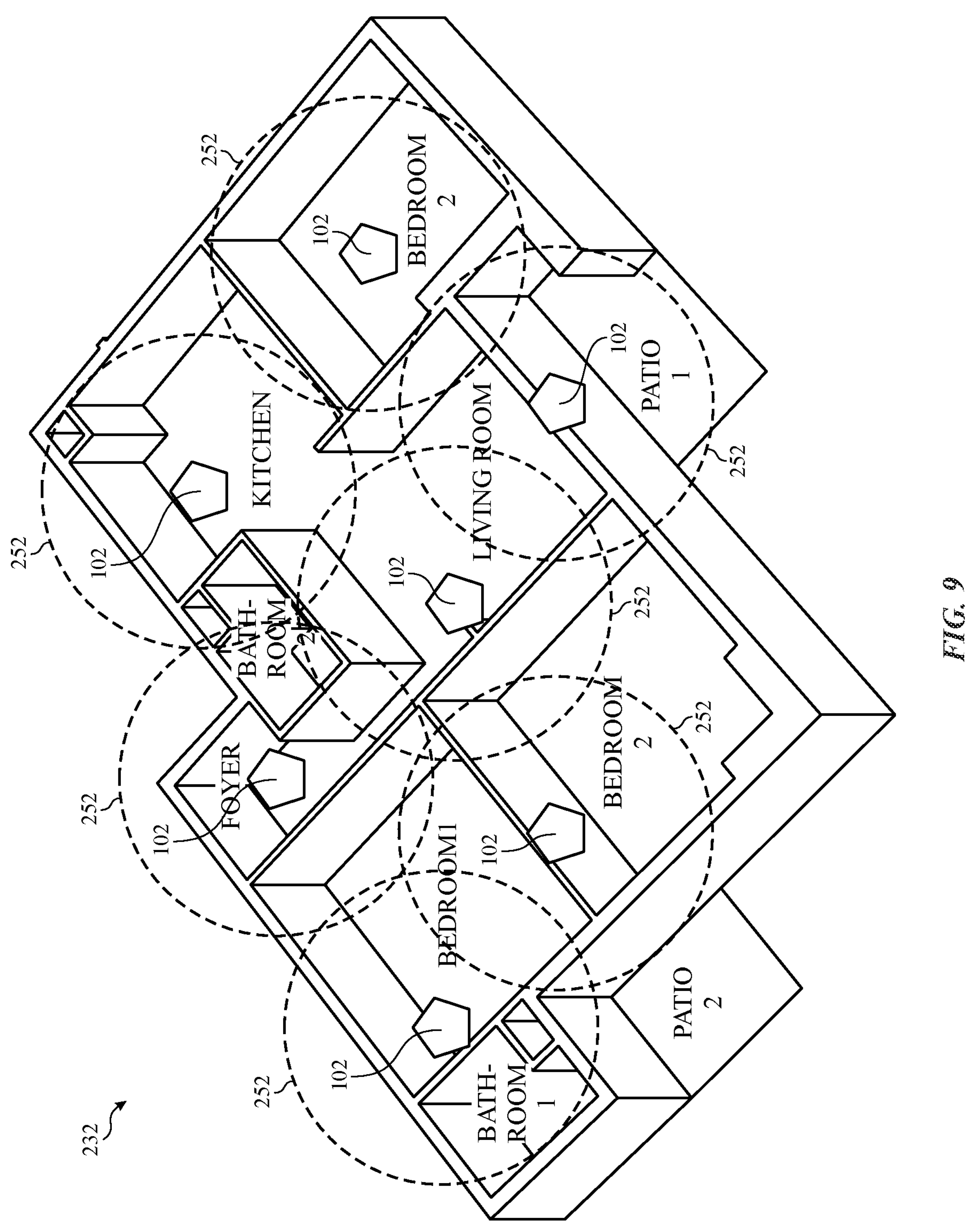
FIG. 9 is a floorplan of a residence in which the electronic device of FIG. 8 may be located, according to embodiments of the present disclosure.

To help illustrate, FIG. 9 which is a floorplan of a residence 250 which is one example of a physical location in which the wireless network 232 may be located. As illustrated, the residence includes several areas (e.g., rooms) in which routers 102 of the wireless network 232 may be included. Each of the routers 102 may have a respective coverage area 252, and each electronic device in the wireless network 232 may connect to the wireless network 232 via the router 102 or routers 102 that have coverage areas 252 that provide wireless service. Each of the routers 102 may maintain data, including location data, device identifiers, and data regarding device types (e.g., a device type or identifier of the particular device and/or an indication of a mobility of a particular device or how likely the particular device is to be moved) for itself and any device (e.g., device 104) that is connected to the router 102. The location data may include or be related to a connection strength to the router 102, and the device identifiers may include UUIDs. In any case, each of the routers 102 may maintain data for each device 104 that connects to the given router 102. The routers 102, which may also be communicatively coupled to one another via the wireless network 232 may exchange such data, meaning any of the routers 102 may maintain the data originally gathered by another router 102. Thus, by harnessing the mesh nature of the wireless network 232, data for each device connected to the wireless network 232 may be obtained. As discussed below, this data may be utilized to generate the device map 236.

Returning to FIG. 8, the electronic device 10 may include an application 260 that may be stored in the memory 14 or storage 16, and the application may include instructions that the processor 12 may execute to run the application 260 on the electronic device 10. The application 260 may include a device locating application or another application for which the device map 236 may be generated. The device map 236 may be generated by the processor 12 executing the application 260, or the device map 236 may be generated by processing circuitry 262 of the cloud computing system 234 that executes instructions stored on memory 264 of the cloud computing system 234. The processing circuitry 262 may be implemented with any combination of general-purpose microprocessors, microcontrollers, DSPs, FPGAs, programmable logic devices PLDs, controllers, state machines, gated logic, discrete hardware components, dedicated hardware finite state machines, or any other suitable entities that may perform calculations or other manipulations of information. The processors 12 may include one or more application processors, one or more baseband processors, or both. The memory 264 may be a tangible, non-transitory computer-readable medium. For example, the memory 264 may include any suitable articles of manufacture for storing data and executable instructions, such as random-access memory, read-only memory, rewritable flash memory, hard drives, and optical discs.

The processor 12 may generate the device map 236, or, in other embodiments, the cloud computing system 234 may generate the device map 236 and send the device map 236 to the electronic device 10 (e.g., for display on the display 18). In either case, the electronic device 10 may send, via the transceiver 30, a request 266 to one or more devices of the wireless network 232 for data regarding the devices (e.g., each device connected to the wireless network 232), which may include location data, device identifiers, and data regarding device types. The one or more devices may be a single router 102 or particular routers 102 in the wireless network 232, such as the router(s) 102 through which the electronic device 10 connects to the wireless network 232.

In response to receiving the request 266, the router 102 (or routers 102) may gather the respective data of the other routers 102 regarding the routers 102 themselves and the devices 104 connected to the routers. Thus, one router 102 may aggregate the data for some of the routers 102 or each router 102 of the wireless network 232 and send the requested data, or a portion thereof, to the electronic device 10 in the form a response 238. As such, the electronic device 10 may receive a single response 268 or several responses 268 from one or more routers 102. The response 268 may include the data requested by the request 266. The processor 12 of the electronic device 10 may utilize the data included or indicated by the response 268 to generate the device map 236 (e.g., independently from the cloud computing system 234) as described below with respect to FIGS. 10-12.

In embodiments in which the cloud computing system 234 generates the device map 236, the electronic device 10 may send the response 268 to the cloud computing system 234. The cloud computing system 234 may generate the device map 236 as described below respect to FIGS. 10-12. As discussed below, particularly with respect to FIG. 11 and FIG. 12, in some embodiments, the device map 236 may be generated based at least in part on one or more locations (and/or device types) of electronic devices (e.g., routers 102 and devices 104) in the wireless network 232. In such embodiments in which the cloud computing system 234 generates the device map 236, the cloud computing system 234 may send a request for user input 270 regarding the location and/or device type of one or more particular electronic devices in the wireless network 232. In response to receiving the request, the electronic device 10 may provide a user interface (e.g., a graphical user interface of the application 260) in which a user may interact with the user interface to indicate the location(s) of the electronic device (s) and/or the device type(s) of the electronic device(s). The user interaction or data regarding the user interaction (e.g., placement of electronic devices and device types) may be provided to the cloud computing system 234, which may utilize the input 272 to generate the device map 236.

Figure 10:
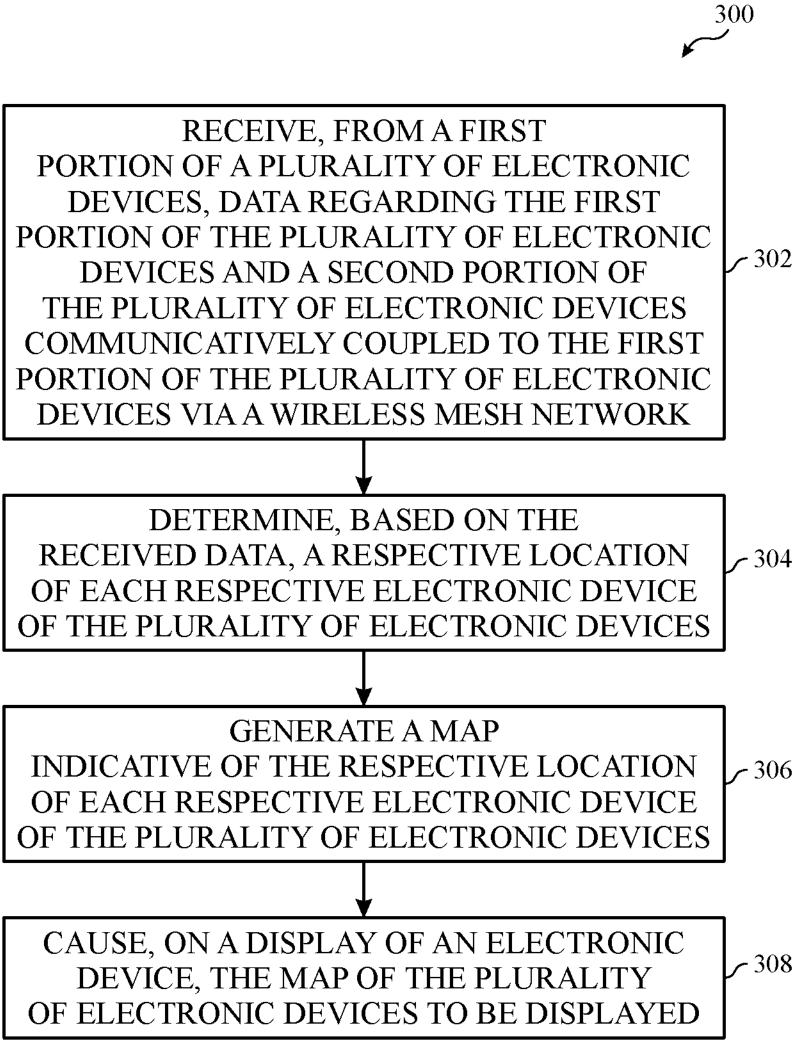
FIG. 10 is a flow diagram of a process for generating the device map of FIG. 8, according to embodiments of the present disclosure.

Continuing with the drawings, FIG. 10 is a flow diagram of a process 300 for generating the device map 236. Any suitable device (e.g., a controller) that may control components of the electronic device 10, such as the processor 12, may perform the process 300. In some embodiments, the process 300 may be implemented by executing instructions stored in a tangible, non-transitory, computer-readable medium, such as the memory 14 or storage 16, using the processor 12. For example, the process 300 may be performed at least in part by one or more software components, such as an operating system of the electronic device 10, one or more software applications of the electronic device 10, and the like. Moreover, the process 300 may be performed by the processing circuitry 262 of the cloud computing system 234 by executing instructions stored on the memory 264 of the cloud computing system 234. The processing circuitry 262 may perform the process 300 alone or in combination with the processor 12 of the electronic device 10. Thus, while the process 300 is described below largely as being performed by the processor 12, the process 300 may alternatively be performed by the processing circuitry 262 alone or in combination with the processor 12. Furthermore, while the process 300 is described using steps in a specific sequence, it should be understood that the present disclosure contemplates that the described steps may be performed in different sequences than the sequence illustrated, and certain described steps may be skipped or not performed altogether.

In process block 302, the processor 12 may receive, from a first portion several electronic devices, data regarding the first portion of the several electronic devices and a second portion of the several electronic devices that are communicatively coupled to the first portion of the several electronic devices via a wireless network. For example, the processor 12 may receive data from one or more of the routers 102 regarding the one or more routers 102 and any electronic devices (e.g., devices 104) communicatively coupled to the routers 102 via the wireless network 232. Indeed, the data may be the response 268 described above with respect to FIG. 8 that may be sent in response to receiving the request 266 that the electronic device 10 may transmit. While the processor 12 may receive the response 268 from a single router 102, it should be noted that the response may include data for each router 102 of the wireless network 232 and each device 104 in the wireless network 232. Furthermore, it should be noted that, in some embodiments, the data receiving in process block 302 may be collected by one or more router 102 using the adaptive beaconing techniques described above.

In process block 304, the processor 12 may determine a location of each electronic device of the several electronic devices based on the data received at process block 302. In other words, the processor 12 may determine a location of each node (i.e., each of the routers 102 and the devices 104 (and the electronic device 10)) in the wireless network 232 based on the response 268. As noted above, the response may be indicative of the locations of the nodes of the wireless network 232. As such, using the response 268, the processor 12 may determine a location for each of the nodes of the wireless network 232.

In process block 306, the processor 12 may generate a map indicative of the locations of the nodes of the wireless network 232 as determined in process block 334. In other words, the processor 12 may generate the device map 236, and the locations of the nodes included in the device map 236 may correspond to the locations of the nodes as determined in process block 304.

In process block 308, the processor 12 may cause the device map 236 to be displayed via the display 18 of the electronic device 10. That is, the processor 12 may cause the device map 236 that indicates the location of the electronic devices (e.g., routers 102, devices 104, and electronic device 10) in the wireless network 232 to be displayed. As noted above, and as will be described in more detail below, the device map 236 may indicate the locations of the devices in the wireless network 232 within a representation (e.g., floorplan) of an area in which the wireless network 232 is included, such as a residence or office. Accordingly, a user may utilize the device map 236, for instance, to locate one or more electronic devices that are connected to the wireless network 232.

Figure 11:
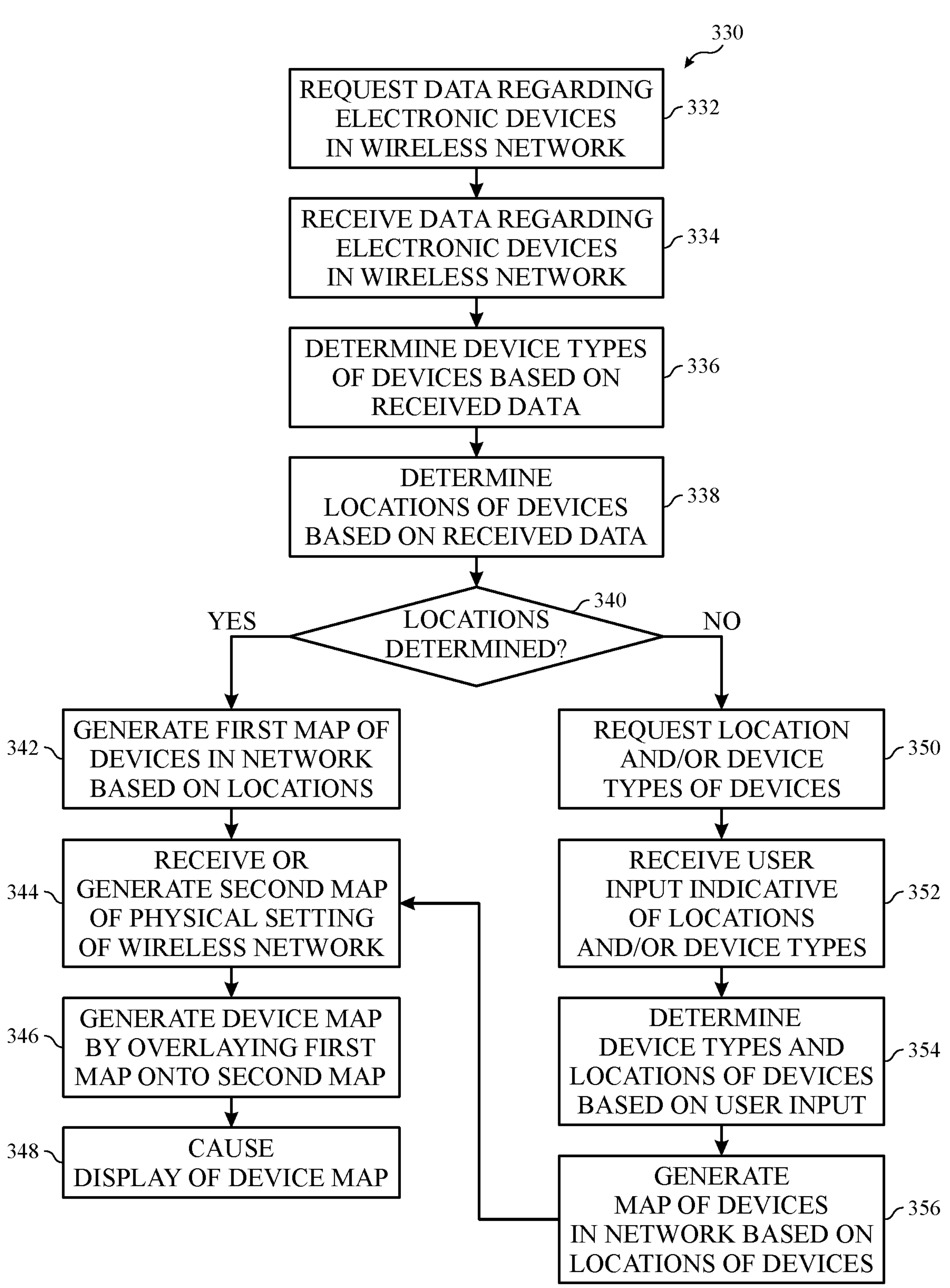
FIG. 11 is a flow diagram of another process for generating the device map of FIG. 8, according to embodiments of the present disclosure.

Continuing with the drawings, FIG. 11 is a flow diagram of another process 330 for generating the device map 236. Any suitable device (e.g., a controller) that may control components of the electronic device 10, such as the processor 12, may perform the process 330. In some embodiments, the process 330 may be implemented by executing instructions stored in a tangible, non-transitory, computer-readable medium, such as the memory 14 or storage 16, using the processor 12. For example, the process 330 may be performed at least in part by one or more software components, such as an operating system of the electronic device 10, one or more software applications of the electronic device 10, and the like. Moreover, the process 330 may be performed by the processing circuitry 262 of the cloud computing system 234 by executing instructions stored on the memory 264 of the cloud computing system 234. The processing circuitry 262 may perform the process 330 alone or in combination with the processor 12 of the electronic device 10. Thus, while the process 330 is described below largely as being performed by the processor 12, the process 330 may alternatively be performed by the processing circuitry 262 alone or in combination with the processor 12. Furthermore, while the process 330 is described using steps in a specific sequence, it should be understood that the present disclosure contemplates that the described steps may be performed in different sequences than the sequence illustrated, and certain described steps may be skipped or not performed altogether.

In process block 332, the processor 12 may request data regarding electronic devices in a wireless network. For instance, in the context of FIG. 8, the processor 12 may send the request 266 to one or more routers 102 of the wireless network 232 for data (e.g., location data, device identifiers, etc.) regarding the electronic devices (e.g., routers 102, devices 104, and (in some embodiments) the electronic device 10) connected to the wireless network 232.

In process block 334, the processor 12 may receive data regarding the devices in the wireless network 232. For instance, the processor 12 may receive the response 268 from one or more of the routers 102 regarding the one or more routers 102 and any electronic devices (e.g., devices 104) communicatively coupled to the routers 102 in the wireless network 232.

In process block 336, the processor 12 may determine a device type for each of the devices based on the response 268. In particular, the device type may be determined based on an identifier or other data in the response 268 that may indicate what the device is (e.g., a phone, a particular type of appliance or other smart device, a tablet, a computer, etc.). The device type determined for each device may be associated with a mobility of a particular device is. For instance, in one embodiment, the devices types may include static, semi-static, and mobile. Static devices may be devices that are fixed and/or not likely to be moved. Static devices could include routers (e.g., electrical equipment that could potentially be one of the routers 102), smart televisions, and certain smart appliances (e.g., refrigerators, dishwashers, washers, dryers). Semi-static devices may include devices that may be moved but may likely be located in one of a few locations. For example, smart speakers may be classified as semi-static devices. Mobile devices may be devices that are portable and likely to be moved by a user. For example, a mobile phone, tablet, smart watch, or other wearable electronic device may be classified as a mobile device.

In process block 338, the processor 12 may determine a location of each electronic device of the several electronic devices based on the response 268 received at process block 334. In other words, the processor 12 may determine a location of each node (i.e., each of the routers 102 and the devices 104 (and the electronic device 10)) in the wireless network 232 based on the response 268. As noted above, the response may be indicative of the locations of the nodes of the wireless network 232. As such, using the response 268, the processor 12 may determine a location for each of the nodes of the wireless network 232.

In decision block 340, processor 12 may determine whether locations have been determined for each of the electronic devices in the wireless network 232. More specifically, the processor 12 may determine whether the locations determined in process block 338 meet one or more accuracy thresholds or that the determined locations for particular types of devices meet or exceed an accuracy threshold. For instance, there may be thresholds for static, semi-static, and mobile devices types, with the static threshold being the highest value (i.e., most accurate) and the mobile device type being the lowest value (i.e. lowest accuracy). As the locations of some devices (e.g., mobile and potentially semi-static devices) may be determined based on the locations other devices (e.g., routers 102 or static devices), if the locations of the routers 102 or static device is not determined to meet an accuracy threshold, the processor 12 may determine that the locations of the electronic devices have not been determined. Conversely, the processor 12 may determine that the locations have been determined when the locations of the routers 102 and/or static devices meet an accuracy threshold.

Upon determining that the locations of the devices have been determined in decision block 340, in process block 342, the processor 12 may generate a first map of the electronic devices in the wireless network 232 based on the locations determined in process block 338. The first map may include a map that only includes the electronic devices in the wireless network 232 without a context for a real world location (e.g., a physical setting) in which the wireless network 232 is located. For example, if the wireless network 232 is located in a residence, the first map may be agnostic of the rooms of the residence and instead indicate the locations of the electronic devices in the wireless network 232 relative to one another.

In process block 344, the processor 12 may receive or generate a second map of the physical setting (e.g., real world location) of the wireless network 232. For example, the processor 12 may receive the second map from a website or an image or other file stored on the memory 14 or storage 16 of the electronic device 10 that may be selected by the user (e.g., as prompted during an interaction with a user interface provided by the application 260 that generates the device map 236). Alternatively, the processor 12 may generate the second map based on sensor data, such as LiDAR sensor data collected by one or more LiDAR sensors the electronic device 10. In some embodiments, the second map may be a floorplan of the physical setting in which the wireless network 232 is located.

In process block 346, the processor 12 may generate the device map 236 by overlaying the first map (i.e., the map generated in process block 342) onto the second map (i.e., the map generated in process block 344). In other words, the processor 12 may generate the device map 236 by combining the first map and the second map. When generated, the device map 236 may accordingly indicate where each electronic device in the wireless network 232 is located within the context of the real world environment in which the wireless network 232 is located. In process block 348, the processor 12 may cause the device map 236 to be displayed via the display 18 of the electronic device 10.

However, if in decision block 340 the processor 12 determines that the locations have not been determined, in process block 350, the processor 12 may request user input regarding the location and/or device types of the electronic devices in the wireless network 232 or a subset of the electronic devices in the wireless network 232. Such a request may be, or correspond to, the request for input 270 of FIG. 8. For example, the processor 12 request user input for the user to classify the device type and/or location for two, three, four, five, or more than five of the electronic devices in the wireless network 232 via a graphical user interface. In process block 352, the processor 12 may receive user input indicative of the locations and/or device types, and such user input may be the input 272.

In process block 354, the processor may determine the device types and locations of the devices based on the user input received in process block 352. In other words, in the process 330, when the device types and/or locations of the devices cannot be determined to an accurate enough degree, the user input may be utilized to set a baseline for the locations and/or device types, which may be propagated and used to determine the device types and/or locations of the other electronic devices in the wireless network 232.

In process block 356, the processor 12 may generate a map (e.g., another first map) based on the locations of the devices determined in process block 354. The processor 12 may do so as described above with respect to process block 342, except that potentially different locations may be utilized or indicated in the map generated at process block 356 relative to the map generated at process block 342 due to the locations in the map generated at process block 356 potentially being selected by a user. After generating the map, the process 330 may continue to process block 344, and the processor 12 may generate the second map as described above. When performing process block 346, the processor 12 may generate the device map 236 by overlaying the map generated at process block 356 onto the second map generated at process block 344. As such, the device map 236 may be generated and displayed on the display 18 of the electronic device 10, for instance, to enable a user to locate one or more of the electronic devices that are connected to the wireless network 232.

Figure 12:
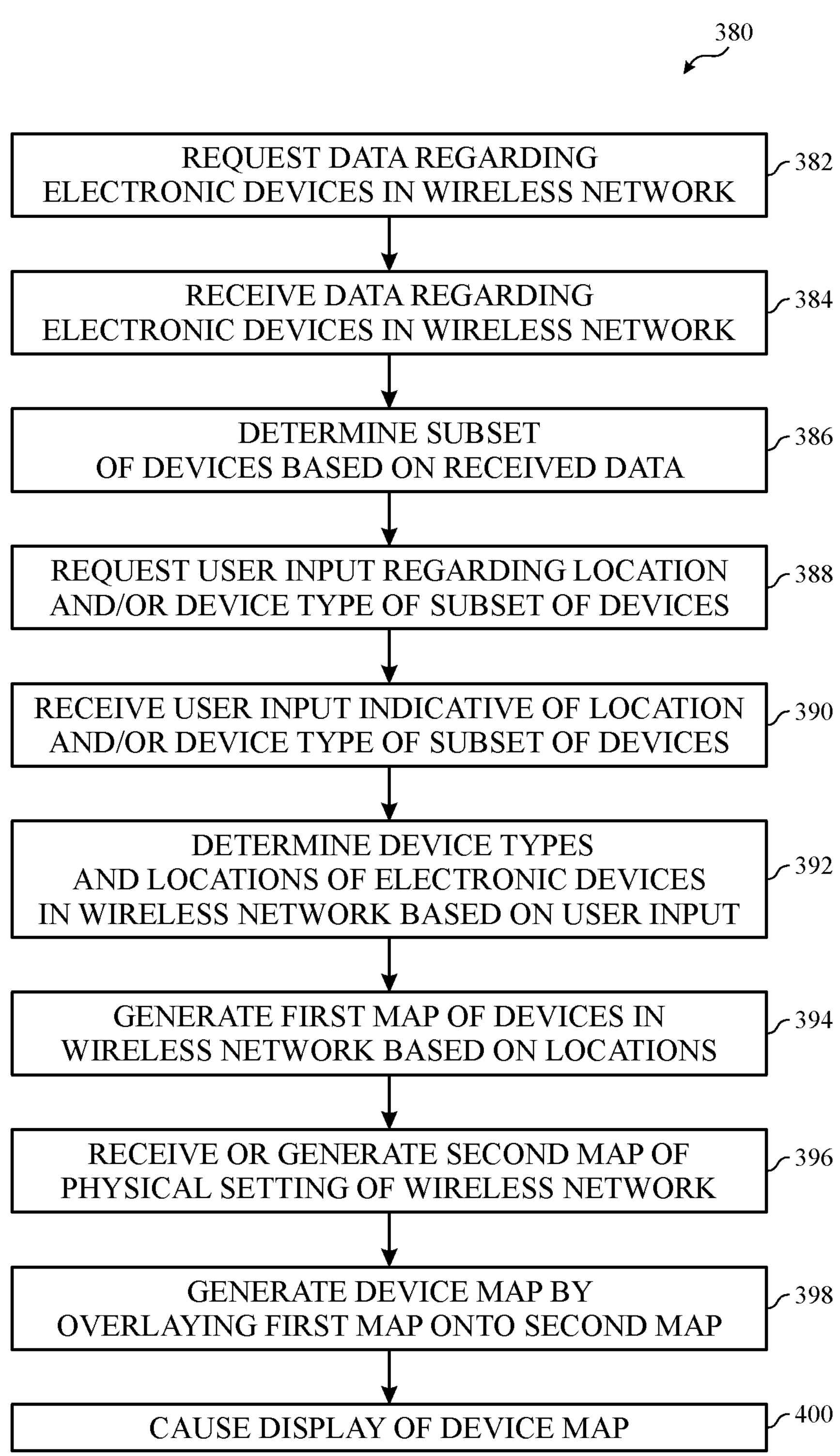
FIG. 12 is a flow diagram of yet another process for generating the device map of FIG. 8, according to embodiments of the present disclosure.

Continuing with the drawings, FIG. 12 is a flow diagram of yet another process 380 for generating the device map 236. Any suitable device (e.g., a controller) that may control components of the electronic device 10, such as the processor 12, may perform the process 380. In some embodiments, the process 380 may be implemented by executing instructions stored in a tangible, non-transitory, computer-readable medium, such as the memory 14 or storage 16, using the processor 12. For example, the process 380 may be performed at least in part by one or more software components, such as an operating system of the electronic device 10, one or more software applications of the electronic device 10, and the like. Moreover, the process 380 may be performed by the processing circuitry 262 of the cloud computing system 234 by executing instructions stored on the memory 264 of the cloud computing system 234. The processing circuitry 262 may perform the process 380 alone or in combination with the processor 12 of the electronic device 10. Thus, while the process 380 is described below largely as being performed by the processor 12, the process 380 may alternatively be performed by the processing circuitry 262 alone or in combination with the processor 12. Furthermore, while the process 380 is described using steps in a specific sequence, it should be understood that the present disclosure contemplates that the described steps may be performed in different sequences than the sequence illustrated, and certain described steps may be skipped or not performed altogether.

In process block 382, the processor 12 may request data regarding electronic devices in a wireless network. For instance, in the context of FIG. 8, the processor 12 may send the request 266 to one or more routers 102 of the wireless network 232 for data (e.g., location data, device identifiers, etc.) regarding the electronic devices (e.g., routers 102, devices 104, and (in some embodiments) the electronic device 10) connected to the wireless network 232.

In process block 384, the processor 12 may receive data regarding the devices in the wireless network 232. For instance, the processor 12 may receive the response 268 from one or more of the routers 102 regarding the one or more routers 102 and any electronic devices (e.g., devices 104) communicatively coupled to the routers 102 in the wireless network 232.

In process block 386, the processor 12 may determine a subset of the electronic devices in the wireless network 232 based on the data received in process block 384. In one embodiment, the subset of the devices determined in process block 386 may include or be limited to static devices (e.g., as determined by the processor 12). In another embodiment, the subset of the electronic devices in the wireless network 232 may be limited to routers 102 in the wireless network 232. In either case, the subset of the electronic devices may include two, three, four, five, or more electronic devices of the wireless network 232.

In process block 388, the processor 12 may request user input regarding the location and/or device types of the electronic devices in the wireless network 232 or a subset of the electronic devices in the wireless network 232. Such a request may be, or correspond to, the request for input 270 of FIG. 8. For example, the processor 12 request user input for the user to classify the device type and/or location for two, three, four, five, or more than five of the electronic devices in the wireless network 232 via a graphical user interface. In process block 390, the processor 12 may receive user input indicative of the locations and/or device types, and such user input may be the input 272.

In process block 392, the processor may determine the device types and locations of the devices based on the user input received in process block 388. In other words, in the process 330, when the device types and/or locations of the devices cannot be determined to an accurate enough degree, the user input may be utilized to set a baseline for the locations and/or device types, which may be propagated and used to determine the device types and/or locations of the other electronic devices in the wireless network 232.

In process block 394, the processor 12 may generate a first map of the electronic devices in the wireless network 232 based on the locations determined in process block 392. The first map may be a map that only includes the electronic devices in the wireless network 232 without a context for a real world location (e.g., a physical setting) in which the wireless network 232 is located. For example, if the wireless network 232 is located in a residence, the first map may be agnostic of the rooms of the residence and instead indicate the locations of the electronic devices in the wireless network 232 relative to one another.

In process block 396, may receive or generate a second map of the physical setting (e.g., real world location) of the wireless network 232. For example, the processor 12 may receive the second map from a website or an image or other file stored on the memory 14 or storage 16 of the electronic device 10 that may be selected by the user (e.g., as prompted during an interaction with a user interface provided by the application 260 that generates the device map 236). Alternatively, the processor 12 may generate the second map based on sensor data, such as LiDAR sensor data collected by one or more LiDAR sensors the electronic device 10. In some embodiments, the second map may be a floorplan of the physical setting in which the wireless network 232 is located.

In process block 398, the processor 12 may generate the device map 236 by overlaying the first map (i.e., the map generated in process block 394) onto the second map (i.e., the map generated in process block 396). In other words, the processor 12 may generate the device map 236 by combining the first map and the second map. When generated, the device map 236 may accordingly indicate where each electronic device in the wireless network 232 is located within the context of the real world environment in which the wireless network 232 is located. In process block 348, the processor 12 may cause the device map 236 to be displayed via the display 18 of the electronic device 10. Furthermore, in process block 400, the processor 12 may cause the device map 236 to be displayed on the display 18 of the electronic device 10. Accordingly, the process 380 enables the device map 236 to be generated based at least in part on a user input. In some instances, the process 380 may be utilized the first time the device map 236 is generated.

In one embodiment, a non-transitory computer-readable medium may include instructions, that when executed by processing circuitry, may cause the processing circuitry to: receive, from a first portion of a plurality of electronic devices, data regarding the first portion of the electronic devices and a second portion of the plurality of electronic devices communicatively coupled to the first portion of the plurality of the electronic devices via a wireless mesh network. When executed, the instructions may also cause the processing circuitry to receive, based on the data, a respective location of each respective electronic device of the plurality of electronic devices, generate a map indicative of the respective location of each respective electronic device of the plurality of electronic devices, display, on a display of an electronic device, the map of the plurality of electronic devices.

The wireless mesh network may include an IEEE Standard 802.15.4 network. The wireless mesh network may include a Thread network. The first portion of the plurality of electronic devices may be one or more routers of the Thread network, and the second portion of the plurality of electronic devices comprises one or more electronic devices connected to the Thread network via the one or more routers.

When executed, the instructions may cause the processing circuitry to determine a subset of the plurality of electronic devices, display, on the display electronic device, a request regarding the subset of the plurality of electronic devices, receive a response to the request, and determine, based on the response, the respective location of each respective electronic device of the plurality of electronic devices. The response may be indicative of one or more user-selected locations of one or more electronic devices of the subset of the plurality of electronic devices. The response may be indicative device types of one or more electronic devices of the subset of the plurality of electronic devices, and, the instructions, when executed, may cause the processing circuitry to determine one or more locations of one or more electronic devices of the second portion of the plurality of electronic devices based on device types.

When executed, the instructions may cause the processing circuitry to receive a second map of a physical setting in which the wireless mesh network is located or generate the second map. The physical setting may be a residence or a building. When executed, the instructions may cause the processing circuitry to receive data generated by a light detection and ranging (LiDAR) sensor regarding the physical setting and generate the second map based on the data generated by the LiDAR sensor. The electronic device may include the non-transitory computer-readable medium, the processing circuitry, and the LiDAR sensor.

The processing circuitry may be included in one or more computing devices located outside of the electronic device and the physical setting. The electronic device may include the non-transitory computer-readable medium and the processing circuitry.

In another embodiment, an electronic device includes a display, a transceiver configured to communicatively couple to a wireless mesh network, and processing circuitry operatively coupled to the display and the transceiver. The processing circuitry may be configured to receive, from a first portion of a plurality of electronic devices of the wireless mesh network, data regarding the first portion of the electronic devices and a second portion of the plurality of electronic devices communicatively coupled to the first portion of the plurality of the electronic devices via the wireless mesh network. The processing circuitry may also be configured to determine, based on the data, a respective location of each respective electronic device of the plurality of electronic devices, generate a first map indicative of the respective location of each respective electronic device of the plurality of electronic devices, generate or receive a second map indicative of a physical environment in which the plurality of electronic devices is present, and generate a device map based on the first map and the second map. The device map may be indicative of the physical environment and the respective location of each respective electronic device of the plurality of electronic devices. Additionally, the processing circuitry may be configured to display the device map via the display.

The electronic device may include a light detection and ranging (LiDAR) sensor configured to collect LiDAR data. The processing circuitry may be configured to generate the device map by generating the second map based on the LiDAR data and combining the first map and the second map.

The processing circuitry may be configured to generate the map without receiving user input regarding any respective location of electronic devices of the plurality of electronic devices.

In yet another embodiment, a computer-implemented method includes receiving, via processing circuitry and from an electronic device of a plurality of electronic devices connected to a wireless mesh network, data regarding the plurality of electronic devices. The data may include location data, device identifiers, device types, or a combination thereof. The computer-implemented method also includes determining, via the processing circuitry and based on the data, a respective location of each respective electronic device of the plurality of electronic devices. Additionally, the computer-implemented method includes generating, via the processing circuitry, a map indicative of the respective location of each respective electronic device of the plurality of electronic devices. Furthermore, the computer-implemented method includes sending, via the processing circuitry and to the electronic device, the map of the plurality of electronic devices for display on the electronic device.

The computer-implemented method may include classifying, via the processing circuitry, each electronic device of the plurality of electronic devices as being a device type of a plurality of device types, determining, via the processing circuitry, a subset of the plurality of electronic devices having a first device type of the plurality of device types, requesting and receiving, via the processing circuitry, user input regarding the respective location of each respective electronic device of the subset of the plurality of electronic devices, determining, via the processing circuitry, the respective location of each respective electronic device of the plurality of electronic devices based at least in part on the user input. The plurality of devices types may include static devices, semi-static devices, and mobile devices, and the first device type may correspond to static devices.

The processing circuitry may be included in one or more computing devices located outside of the plurality of electronic devices and in a different physical location than the plurality of electronic devices.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112 (f). However, for any claims containing elements designated in any other manner, it is intended that such elements are not to be interpreted under 35 U.S.C. 112 (f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A non-transitory computer-readable medium comprising instructions, that when executed by processing circuitry, cause the processing circuitry to:

receive, from a first portion of a plurality of electronic devices, data regarding the first portion of the plurality of electronic devices and a second portion of the plurality of electronic devices communicatively coupled to the first portion of the plurality of electronic devices using a wireless mesh network;

determine a device type of a plurality of device types for each of the plurality of electronic devices based on the data, wherein the plurality of device types comprises a static device, a semi-static device, and a mobile device;

determine a location of each of the plurality of electronic devices based on the data;

generate a map indicative of the location of each of the plurality of electronic devices and the device type of each of the plurality of electronic devices; and generate, for display on an electronic device, the map of the plurality of electronic devices.

2. The non-transitory computer-readable medium of claim 1, wherein the wireless mesh network comprises an Institute of Electrical and Electronics Engineers (IEEE) Standard 802.15.4 network.

3. The non-transitory computer-readable medium of claim 2, wherein the wireless mesh network comprises a Thread network.

4. The non-transitory computer-readable medium of claim 3, wherein:

the first portion of the plurality of electronic devices comprises one or more routers of the Thread network; and the second portion of the plurality of electronic devices comprises one or more electronic devices connected to the Thread network using the one or more routers.

5. The non-transitory computer-readable medium of claim 1, wherein the instructions, when executed, cause the processing circuitry to determine the location of a subset of the plurality of electronic devices based on receiving a user input comprising a user selection of the location of each electronic device of the subset of the plurality of electronic devices.

6. The non-transitory computer-readable medium of claim 5, wherein:

the user input is indicative of the device type of each electronic device of the subset of the plurality of electronic devices; and the instructions, when executed, cause the processing circuitry to determine the location of each electronic device of the subset of the plurality of electronic devices based on the device type.

7. The non-transitory computer-readable medium of claim 1, wherein the instructions, when executed, cause the processing circuitry to:

receive a second map of a physical setting in which the wireless mesh network is located; or generate the second map.

8. The non-transitory computer-readable medium of claim 7, wherein the physical setting is a residence or a building.

9. The non-transitory computer-readable medium of claim 7, wherein the instructions, when executed, cause the processing circuitry to:

receive data generated by a light detection and ranging (LiDAR) sensor regarding the physical setting; and generate the second map based on the data generated by the LiDAR sensor.

10. The non-transitory computer-readable medium of claim 9, wherein the electronic device comprises the non-transitory computer-readable medium, the processing circuitry, and the LiDAR sensor.

11. The non-transitory computer-readable medium of claim 7, wherein the processing circuitry is included in one or more computing devices located outside of the electronic device and the physical setting.

12. The non-transitory computer-readable medium of claim 1, wherein the electronic device comprises the non-transitory computer-readable medium and the processing circuitry.

13. An electronic device comprising:

a display;

transceiver circuitry configured to communicatively couple to a wireless mesh network;

processing circuitry operatively coupled to the display and the transceiver circuitry, wherein the processing circuitry is configured to:

receive, from a first portion of a plurality of electronic devices of the wireless mesh network, data regarding the first portion of the plurality of electronic devices and a second portion of the plurality of electronic devices communicatively coupled to the first portion of the plurality of electronic devices using the wireless mesh network;

determine, based on the data, a device type of a plurality of device types for each of the plurality of electronic devices, wherein the plurality of device types comprises a static device, a semi-static device, and a mobile device;

determine, based on the data, a location of each electronic device of the plurality of electronic devices;

generate a first map indicative of the location of each electronic device of the plurality of electronic devices;

generate or receive a second map indicative of a physical environment in which the plurality of electronic devices is present;

generate a device map based on the first map, the second map, and the device type of each of the plurality of electronic devices, wherein the device map is indicative of the physical environment, the location of each electronic device of the plurality of electronic devices, and the device type of each of the plurality of electronic devices; and display the device map using the display.

14. The electronic device of claim 13, comprising a light detection and ranging (LiDAR) sensor configured to collect LiDAR data, wherein the processing circuitry is configured to generate the device map by:

generating the second map based on the LiDAR data; and combining the first map and the second map.

15. A computer-implemented method comprising:

receiving, using processing circuitry and from an electronic device of a plurality of electronic devices connected to a wireless mesh network, data regarding the plurality of electronic devices, wherein the data comprises location data, device identifiers, device types, or a combination thereof;

determining, using the processing circuitry and based on the data, a device type of a plurality of device types for each of the plurality of electronic devices, wherein the plurality of device types comprises a static device, a semi-static device, and a mobile device;

determining, using the processing circuitry and based on the data, a location of each electronic device of the plurality of electronic devices;

generating, using the processing circuitry, a first map indicative of the location of each electronic device of the plurality of electronic devices;

generating, using the processing circuitry, a second map indicative of a physical environment in which the plurality of electronic devices is present;

generating, using the processing circuitry, a device map based on the first map, the second map, and the device type of each of the plurality of electronic devices, wherein the device map indicates the physical environment, the location of each electronic device of the plurality of electronic devices, and the device type of each of the plurality of electronic devices; and causing transmission of, using the processing circuitry and to the electronic device, the device map of the plurality of electronic devices.

16. The computer-implemented method of claim 15, comprising:

requesting and receiving, using the processing circuitry, user input regarding the location of each electronic device of a subset of the plurality of electronic devices; and determining, using the processing circuitry, the location of each electronic device of the subset of the plurality of electronic devices based at least in part on the user input.

17. The computer-implemented method of claim 15, wherein the processing circuitry is included in one or more computing devices located outside of the plurality of electronic devices and in a different physical location than the plurality of electronic devices.

18. The computer-implemented method of claim 15, wherein the first map does not correspond to the physical environment in which the plurality of electronic devices is present.

19. The non-transitory computer-readable medium of claim 1, wherein the instructions, when executed, cause the processing circuitry to determine the location of each of the plurality of electronic devices based on a user input indicating an area or room where each of the plurality of electronic devices is located.

20. The electronic device of claim 13, wherein the processing circuitry is configured to determine, based on the data, that the location of each electronic device of the plurality of electronic devices meets an accuracy threshold based on the device type for each of the plurality of electronic devices.

* * * * *